(12) United States Patent
Yang et al.

(10) Patent No.: US 8,913,779 B2
(45) Date of Patent: Dec. 16, 2014

(54) SYSTEM AND METHOD FOR SECURING MEDIA CONTENT

(75) Inventors: Lei Yang, Gainesville, FL (US); Qian Chen, Gainesville, FL (US); Jun Tian, Belle Mead, NJ (US); Hong Heather Yu, West Windsor, NJ (US); Dapeng Oliver Wu, Gainesville, FL (US)

(73) Assignee: Futurewei Technologies, Inc., Plano, TX (US)

( * ) Notice: Subject to any disclaimer, the term of this patent is extended or adjusted under 35 U.S.C. 154(b) by 1003 days.

(21) Appl. No.: 13/009,780

(22) Filed: Jan. 19, 2011

(65) Prior Publication Data

US 2011/0188703 A1 Aug. 4, 2011

Related U.S. Application Data

(60) Provisional application No. 61/300,635, filed on Feb. 2, 2010.

(51) Int. Cl.
G06K 9/00 (2006.01)
H04N 21/2347 (2011.01)
H04N 21/8358 (2011.01)

(52) U.S. Cl.
CPC ........ H04N 21/2347 (2013.01); H04N 21/8358 (2013.01)
USPC ......................................................... 382/100

(58) Field of Classification Search
USPC ........................................................ 382/100
See application file for complete search history.

(56) References Cited

U.S. PATENT DOCUMENTS

| | | | |
|---|---|---|---|
| 2003/0202659 A1 | 10/2003 | Rodriguez | |
| 2004/0187004 A1* | 9/2004 | Ray et al. | 713/176 |
| 2005/0262352 A1 | 11/2005 | Kessler et al. | |
| 2006/0269097 A1 | 11/2006 | Mihcak et al. | |
| 2009/0136083 A1 | 5/2009 | Picard et al. | |
| 2009/0232352 A1* | 9/2009 | Carr et al. | 382/100 |
| 2010/0031014 A1* | 2/2010 | Senda | 713/150 |

FOREIGN PATENT DOCUMENTS

| | | |
|---|---|---|
| CN | 1447233 A | 10/2003 |
| CN | 1471019 A | 1/2004 |
| CN | 1694528 A | 11/2005 |
| CN | 1960428 A | 5/2007 |
| CN | 101258752 A | 9/2008 |
| CN | 101427265 A | 5/2009 |

OTHER PUBLICATIONS

Federal Information Processing Standards Publication 197, Announcing the Advanced Encryption Standard (AES), Nov. 26, 2001, 51 pages.

(Continued)

Primary Examiner — Matthew Bella
Assistant Examiner — Julian Brooks
(74) Attorney, Agent, or Firm — Slater & Matsil, L.L.P

(57) ABSTRACT

A system and method for securing media content are provided. A method for distributing security media content includes embedding a marking payload into media content, thereby producing embedded media content, applying a transform to the embedded media content, thereby producing secured media content, and distributing the secured media content. The marking payload is embedded based on perceptual information regarding the media content.

27 Claims, 6 Drawing Sheets

(56) References Cited

OTHER PUBLICATIONS

Cheng, H., "A Review of Video Registration Methods for Watermark Detection in Digital Cinema Applications," ISCAS 2004, IEEE, pp. v-704-v-707.

Duric, Z., et al., "Recovering Watermarks from Images," Center for Securing Information Systems, Apr. 15, 1999, 23 pages, George Mason University, Fairfax, VA.

Langton, C., "Coding and decoding with Convolution Codes," Tutorial 12, www.complextoreal.com, Jul. 1999, 29 pages.

Lucas, B.D., et al., "An Iterative Image Registration Technique with an Application to Stereo Vision," IJCAI 1981, pp. 674-679.

Shi, J. et al., "Good Features to Track," IEEE, 1994, pp. 593-600.

Chinese Office Action received in Application No. 201180001637.7 mailed May 20, 2014, 13 pages.

\* cited by examiner

SYSTEM AND METHOD FOR SECURING MEDIA CONTENT

This application claims the benefit of U.S. Provisional Application No. 61/300,635, filed Feb. 2, 2010, entitled "Forensic Tracking for Media Content Delivery," which application is hereby incorporated herein by reference.

TECHNICAL FIELD

The present invention relates generally to media distribution, and more particularly to a system and method for securing media content.

BACKGROUND

Protecting the value of media content is among the biggest challenges of media content delivery. Without proper protection, content owners, content providers, and service providers may be reluctant to release their valuable media content. In the past, digital rights management has been widely used for content protection. Valuable media content is encrypted in scrambled form, which prevents unauthorized access to the media content. Only those with the proper rights to the media content could decrypt and access the content.

However, digital rights management is a passive content protection scheme and only protects the content very well when the media content is in scrambled form. When the media content is decrypted and in its clear form, the protection is gone. While in the clear form, the media content may be freely copied and distributed. Thus a more active content protection technique is needed. The active content protection technique may be used in additional to digital rights management.

SUMMARY OF THE INVENTION

These and other problems are generally solved or circumvented, and technical advantages are generally achieved, by example embodiments of the present invention which provides a system and method for securing media content.

In accordance with an example embodiment of the present invention, a method for distributing security media content is provided. The method includes: embedding a marking payload into media content; applying a transform to the embedded media content, thereby producing secured media content; and distributing the secured media content. The marking payload is embedded based on perceptual information regarding the media content, thereby producing embedded media content.

In accordance with another example embodiment of the present invention, a method extracting information embedded in media content is provided. The method includes: matching a candidate media content to an original media content; correlating a marking pattern to the candidate media content, thereby producing a sequence of values; decrypting the sequence of values, thereby producing a decrypted sequence of values; and outputting the decrypted sequence of values as the information.

In accordance with another example embodiment of the present invention, a system is provided that includes an embedder and a detector. The embedder is coupled to a media content input. The embedder embeds information into media content provided by the media content input, and transforms the embedded media content to produce secured media content. The information is embedded based on perceptual information regarding the media content. The detector is coupled to a candidate media input and to the media content input. The detector matches a candidate media content provided by the candidate media input to original media content provided by the media content input, correlates a matching pattern to the candidate media content to produce a sequence of values, and decrypts the sequence of values to produce information embedded in the candidate media content.

One advantage disclosed herein is that media content is protected using an active protection technique that enables the discovery of information regarding the media content to track the origination of the media content, thereby potentially enabling the determination of the source of the theft of the media content.

A further advantage of exemplary embodiments is that attempts to remove the active protection in the media content will result in severely distorted/corrupted content, which may make the media content undesirable for distribution.

Yet another advantage of exemplary embodiments is that the active protection of the media content may be adjusted based on the nature of the media content being protected; therefore, the active protection never negatively impacts the perceived quality of the media content.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely video content being protected from unauthorized distribution and/or display by an active protection technique. The invention may also be applied, however, to other forms of media content, such as audio, still images, multimedia, and so forth, wherein there is a desire to protect such media content from unauthorized distribution and/or display. Accordingly, the use of any specific type of media content as described herein is for illustrative purposes only and should not limit or otherwise narrow the scope of the present invention, unless otherwise specifically claimed.

Figure 1:
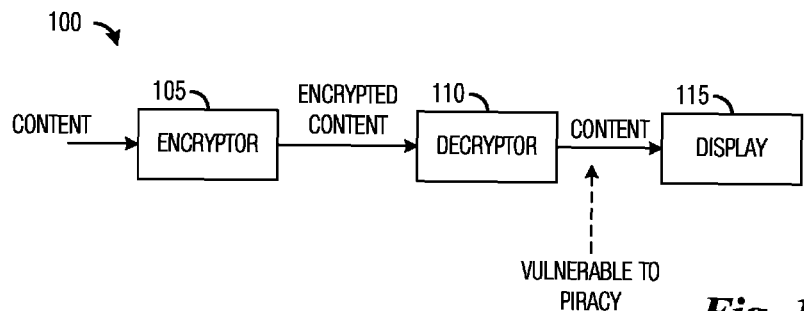
FIG. 1 illustrates an example diagram of a typical prior art passive content protection system for media content.

FIG. 1 illustrates a typical prior art passive content protection system 100 for media content. Passive content protection system 100 makes use of a passive content protection technique to protect the media content from unauthorized distribution and/or display. Passive content protection system 100 includes an encryptor 105 to encrypt media content using a key. Encrypted media content is then protected from unauthorized access since the key used to encrypt the media content (or a corresponding decryption key) must be used to decrypt the encrypted media content.

In order to display the media content, the encrypted media content must be decrypted by a decryptor 110. Decryptor 110 may make use of the key originally used to encrypt the media content or a key that corresponds to the key originally used to encrypt the media content, which may then be displayed by display 115.

However, to display the media content, the media content must be placed in an unencrypted state. While the media content is in its unencrypted state, it may be vulnerable to unauthorized distribution and/or display. As discussed previously, passive content protection techniques only protect the media content for as long as the media content remains in an encrypted state. When the media content is in the unencrypted state, content protection afforded by passive content protection system 100 is no longer in effect.

Furthermore, passive content protection system 100 provides no ability to track the distribution of the media content; therefore, making it potentially difficult to determine where, when, and/or how the media content was breached.

Unlike passive systems, track and trace provides an active content protection technique capable of recording a delivery path of media content during its media life cycle. For example, when usage rights of the media content has been violated (e.g., when someone uploads protected media content to a public access server for sharing with unauthorized users), such system cannot only trace down the origin of the media content, but also can help to track or identify the culprits.

In these track and trace systems, watermarking provides an effective tool for forensic tracking, which embeds identifying marks at each stage of media life cycle. Accordingly, by decoding the track and trace watermark information, the delivery path of a media content is revealed, and the origin of protection breach may be identified.

Figure 2:
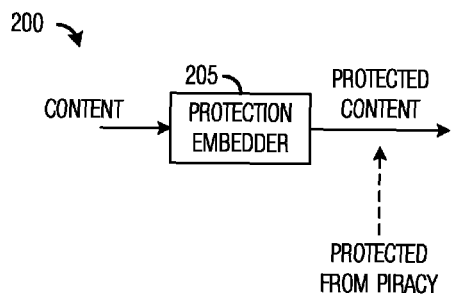
FIG. 2 illustrates an example diagram of a watermark embedding system designed and configured in accordance with exemplary embodiments of the present invention.

FIG. 2 illustrates a watermark embedding system 200. Watermark embedding system 200 includes a protection embedder 205 that may be used to embed a watermark in media content, thereby producing protected content. Protected content may be directly displayed without stripping the watermark; therefore, the media content is protected during its entire lifetime—once the watermark is embedded—from piracy.

Figure 3:
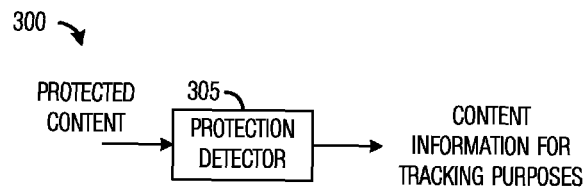
FIG. 3 illustrates an example diagram of a watermark detecting system designed and configured in accordance with exemplary embodiments of the present invention.

FIG. 3 illustrates a watermark detecting system 300. Watermark detecting system 300 includes a protection detector 305. Protection detector 305 may be used to extract a watermark embedded in the protected media content. The watermark may contain information that identifies origination information about the media content, thereby enabling a tracking of the distribution of the media content and potentially a tracing of where, when, and/or how the media content was breached.

Track and trace watermark embedding and detecting are vital components for forensic tracking; wherein, a watermark embedding is a process of inserting information into media content, while detecting extracts the information from the media content to verify authenticity. As disclosed herein, example embodiments employ one or more of spectrum spreading, encryption, error correction coding, geometrical anti-collusion coding and perceptual modeling for generating and embedding information into media content. The information embedded into may allow a determination of where, when, and/or how the media content was breached and the individuals responsible for doing so.

In such example embodiments, watermark patterns are generated from a pseudo-random noise (PN) sequence with a secret generating key. Identification information is then encrypted using Advanced Encryption Standard (AES), coded with convolution error correction code and then transformed into binary bits, which are mapped to a bi-polar sequence to form watermark payload. In this way the embedded information is hidden from or blind to the attackers and the watermark best combats channel noise like attacks. In addition, a perceptual model is built to determine the embedding strength, in order that the watermarked video maintains good or acceptable perceptual quality based on various quantifiable considerations and other factors later described herein. This embedding strength is then used to repeatedly embed the watermark payload in one or more components of video sequence (typically, the Y component). Finally, if additional security measures are desirable, the watermarked video frames may undergo certain minor geometrical transforms—determined by another secret key—so as to combat, e.g., collusion attack.

Furthermore, as mentioned above, example embodiments also provide for determining the presence of embedded information and extracting the embedded information. In such embodiment, the protected media content and the original media content may be compared to extract the embedded information. Decoding and decrypting may also be used to extract the embedded information. The embedded information may then be used to track the media content.

Although the following discussion focuses on video content, the embodiments presented herein are operable with all forms of media content, including but not limited to audio, still images, multimedia, and so forth. Therefore, the discussion of video content should not be construed as being limiting to either the scope or the spirit of the embodiments.

Figure 4A:
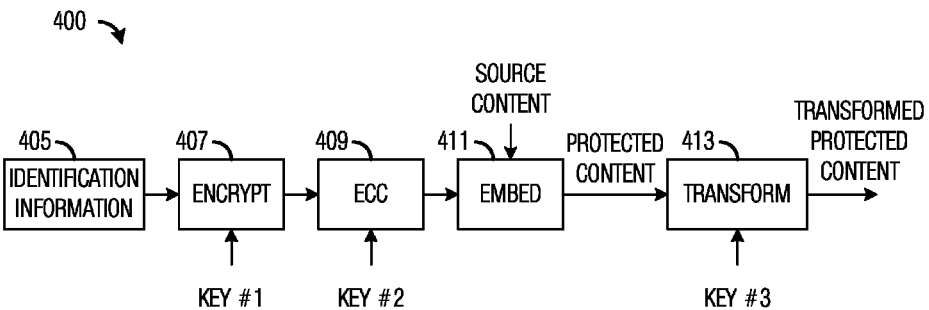
FIG. 4a illustrates an example diagram of an embedding system designed and configured in accordance with exemplary embodiments of the present invention.

FIG. 4a illustrates an embedding system 400. Embedding system 400 may be used to embed identification information in media content for track and trace purposes. According to an embodiment, the media content containing the embedded identification information may have the same general characteristics as the media content without the embedded identification information. For example, if the media content is a video, then the media content with the embedded information will have the same frame size, frame rate, bit rate, length, and so forth.

According to an embodiment, the identification information may be generated by an identification information generate unit 405. The identification information may be in the form of a binary sequence. The binary sequence may have the same size as the media content. Referring back to the example where the media content is a video, the binary sequence may have the same size as a video frame in the media content (the binary sequence may be a binary matrix of dimension: video height×video width, for example). The binary sequence may be generated by identification information generate unit 405 using spread spectrum techniques that may help to improve watermark detection ability.

The binary sequence (containing identification information, such as copyright information, customer information, and so on) may be encrypted by encrypt unit 407. Encrypt unit 407 may encrypt the binary sequence with a first key (KEY #1), which may be associated with an intended recipient of the media content, for example. Encrypting the binary sequence may protect the binary sequence from attackers who wish to detect and/or tamper with the media content. As an example, let a user purchase viewing rights to a movie from an on-line service. The on-line service may encrypt the binary sequence (which may contain the customer's information, as well as identification information of the on-line service, for example) with the first key associated with the user. After encryption, the binary sequence may appear to be noise (such as white noise) to attackers. The encryption methods could be RSA algorithm, Data Encryption Standard (DES), Advance Encryption Standard (AES), and so on. The first key could be chosen by a creator of the media content, a server distributing the media content, and so forth.

To make the embedded information robust against attacks that filter, compress, change format, and so forth, an error correction code (ECC) may be applied to the embedded information, by ECC unit 409, for example. Actually, media content distribution process could be viewed as a channel, and the attacks in the media content distribution process could be viewed as channel noise. Therefore, a convolutional code may be used in ECC unit 409 as an error correction code. According to an embodiment, ECC unit 409 may be provided with a key (a second key (KEY #2)) that may be used to select the convolutional code. Furthermore, the binary bits of the encoded embedded information may be modulated to a bi-polar sequence to form the watermark payload.

The watermark (the encoded embedded information) may be embedded into the media content by embed unit 411. However, rather than simply embedding the watermark into the media content, which may negatively impact perceived quality of the media content, the watermark may be embedded at a level commensurate with the media content. For example, if a particular portion of video is sensitive to quality degradation, the watermark may be embedded at a low strength or not even be embedded at all. While if a particular portion of the video is insensitive to quality degradation, the watermark may be embedded at a high strength. Adaptive embedding strength may be desirable since watermarks embedded at high strength may be easier to detect when compared to watermarks embedded at low strength. Therefore, it may be desirable to increase the embedding strength to enhance detection rate, under the prerequisite that the watermark won't decrease the video quality perceptually.

According to one example embodiment, a perceptual model may be used to determine the embedding strength of the watermark. For a video, the embedding strength may be determined for each pixel in every frame. Therefore, the embedding strength is formulated as: a video height by video width matrix M and a mask for a current frame I, whose elements are floating point numbers representing an embedding strength for a corresponding pixel. Then the watermarked frame W is expressible as $$W = \text{sign}(w) \cdot M \odot P + I, \quad (1)$$

where $\odot$ is element-wise product, P is watermark pattern, and w is watermark payload for the current frame. The perceptual model may be built in a spatial domain as well as the temporal domain. In addition, the watermarked frame may be restricted in a range, for example, a range of [0, 255].

With regard to the spatial domain, example embodiments consider at least two perceptual models for use in determining embedding strength. One such model is based on an edge and/or texture information, with an underlying principle that texture rich area and edges may be embedded with higher strength watermark. Such model is based on the fact that human eyes are more sensitive to changes in smooth areas and less sensitive to changes in noisy areas. According to one example embodiment, it is possible to use a combination of several metrics to describe such area.

One metric may use the difference between current pixel and surrounding pixels. If the difference is large, the current pixel may tolerate relative large changes, i.e., large embedding strength. Such metric can be calculated using a convolution of original frame and a high pass filter H.

Another metric may include a variance of the block where the current pixel resides. In such instance, the larger the variance, the higher the embedding strength.

Yet another may include an entropy of the block where the current pixel resides. In this embodiment, the higher the entropy is, the more textual the area, and the higher embedding strength.

Note that the above metrics could describe the textural features of a pixel in its surrounding area, but no single one of them may be sufficient. Therefore, a spatial mask may be defined from a product of the above and other metrics and a proper scale.

Alternatively, or in conjunction with the above described metrics, other embodiments consider a spatial model based at least in part on a Just Non-noticeable Difference (JND) model. Note that such model has been widely studied and developed in various well known literatures. Accordingly, the specific details of such technique will not be described in detail herein.

With regard to a perceptual model in the temporal domain, example embodiments take advantage of the fact that human eyes are highly sensitive to small changes in static area, but are less sensitive to smooth continuously moving areas. Nevertheless, the simple difference between adjacent frames may not properly describe such smooth continuous moving areas. For example, one common practice dictates that if an object is moving, a smooth background is necessary. Therefore, it may not be possible to embed a high strength watermark without negatively impacting media quality of an image with a smooth background. In such instances, block matching may be performed between two adjacent frames, wherein a difference between these matching blocks may be calculated. The differences may then be scaled as the temporal mask.

To ensure the quality of the media content is maintained to a desired level, example embodiments consider choosing a minimum value of the spatial mask and/or the temporal mask for determining the embedding strength. The selected value (the smaller of the two values) may also be bounded by minimal and maximal values as a final embedding strength.

According to one example embodiment, each bit of the watermark may be spread with a pseudorandom number (PN) sequence. For example, the PN sequence may be fundamental m-sequences, Kasami sequences with optimal cross-correlation values, orthogonal Walsh codes, or so forth. The spread bit(s) of the watermark may then be combined with the media content. For example, each of the spread bits of the watermark may be combined with each frame of a video. Alternatively, one spread bit of the watermark may be combined with each frame of the video, with the spread bits being applied in sequential order as they are arranged in the watermark. Alternatively, a portion of a single spread bit of the watermark may be combined with a frame of the video. For example, a first portion of the single spread bit of the watermark may be combined with a first frame, a second portion of the single spread bit of the watermark may be combined with a second frame, a third portion of the single spread bit of the watermark may be combined with a third frame, and so on.

For instance if a bit of the watermark prior to being spread by the PN sequence is a 1, then it may be possible to add the PN sequence to pixel values of a frame of the video, while if a bit of the watermark prior to being spread by the PN sequence is a 0, then it may be possible to subtract the PN sequence from pixel values of a frame of the video.

After the watermark is embedded, the media content is protected content. However, to further strengthen the protection of the media content, the media content with the embedded watermark may be transformed with another key (a third key (KEY #3)). According to an embodiment, the transformation may be geometric transforms and performed by a transform unit 413. The geometric transforms may be a combination of shifts, resizes, rotations, and other spatial and/or temporal geometric transforms. The transformed media content cannot usually be differentiated from the original media content by human eyes, but computers may readily detect differences. Further, if two or more colluders linearly or non-linearly combine the media content to eliminate the embedded watermark, the resulting video degrades substantially in quality. Such degradation may cause blurring or other undesirable effects to the media content, which may not be acceptable to human eyes. Thus, the geometrical transform thaws the collusion attack at a certain level, which is also referred to as geometrical anti-collusion coding. After transformation, if desired, the protection of the media content may be complete.

Figure 4B:
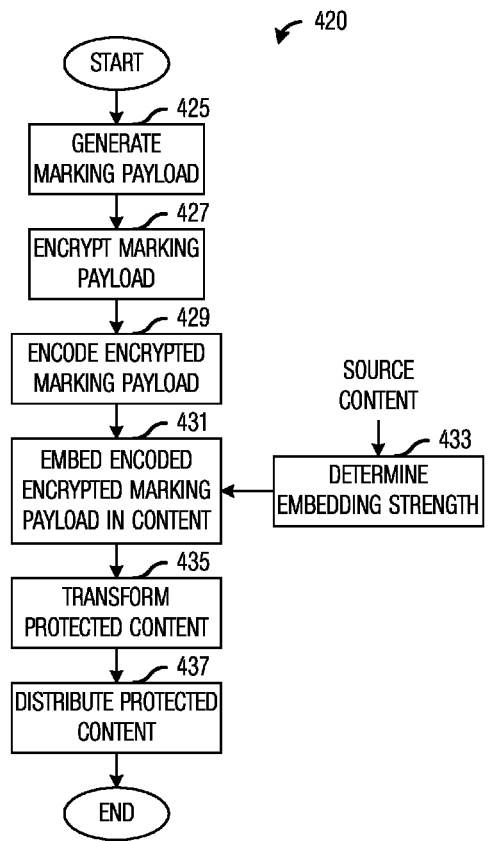
FIG. 4b shows a flow diagram of operations in embedding information in media content in accordance with exemplary embodiments of the present invention.

The above described embodiments of an embedding system 400 (as well as the detection system described below) may also be illustrated in terms of methods comprising functional steps and/or non-functional acts. The following (and subsequent) description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the following description of the flow diagrams(s) for FIGS. 4b, 4c and 5b—is used to indicate the desired specific use (or non-use) of such terms.

As mentioned above, FIG. 4b illustrates a flow diagram of operations 420 in embedding information in media content. Operations 420 may be indicative of operations occurring in an embedding system, such as embedding system 400, as the embedding system embeds watermark information into media content to protect the media content. Operations 420 may occur while the embedding system is in a normal operating mode.

Operations 420 may begin with the embedding system generating a marking payload (block 425). According to an embodiment, the marking payload may contain identification information, such as copyright information, customer information, and so on. The marking payload may then be encrypted with a first key (block 427). Encrypting the marking payload may protect the marking payload from attackers who wish to detect and/or tamper with the media content. The encryption methods could be RSA algorithm, Data Encryption Standard (DES), Advance Encryption Standard (AES), and so on.

Furthermore, the encrypted marking payload may be encoded (block 429). Encoding the encrypted marking payload may help make the encrypted marking payload more robust against attacks that filter, compress, change format, and so forth. In one example embodiment, the encoding may involve the use of a convolutional code selected by a second key. Furthermore, the binary bits of the encoded encrypted marking payload may be modulated to a bi-polar sequence to form the watermark payload.

The encoded encrypted marking payload may then be embedded into the media content (block 431). Prior to embedding the encoded encrypted marking payload, a PN sequence may be applied to the encoded encrypted marking payload. According to an example embodiment, the encoded encrypted marking payload may be embedded with an embedding strength based on the media content itself (block 433). The media content with the embedded encoded encrypted marking payload may then be transformed using a geometric transform to further strengthen the protection of the media content (block 435); thereby, making the media content ready for distribution (block 437).

Figure 4C:
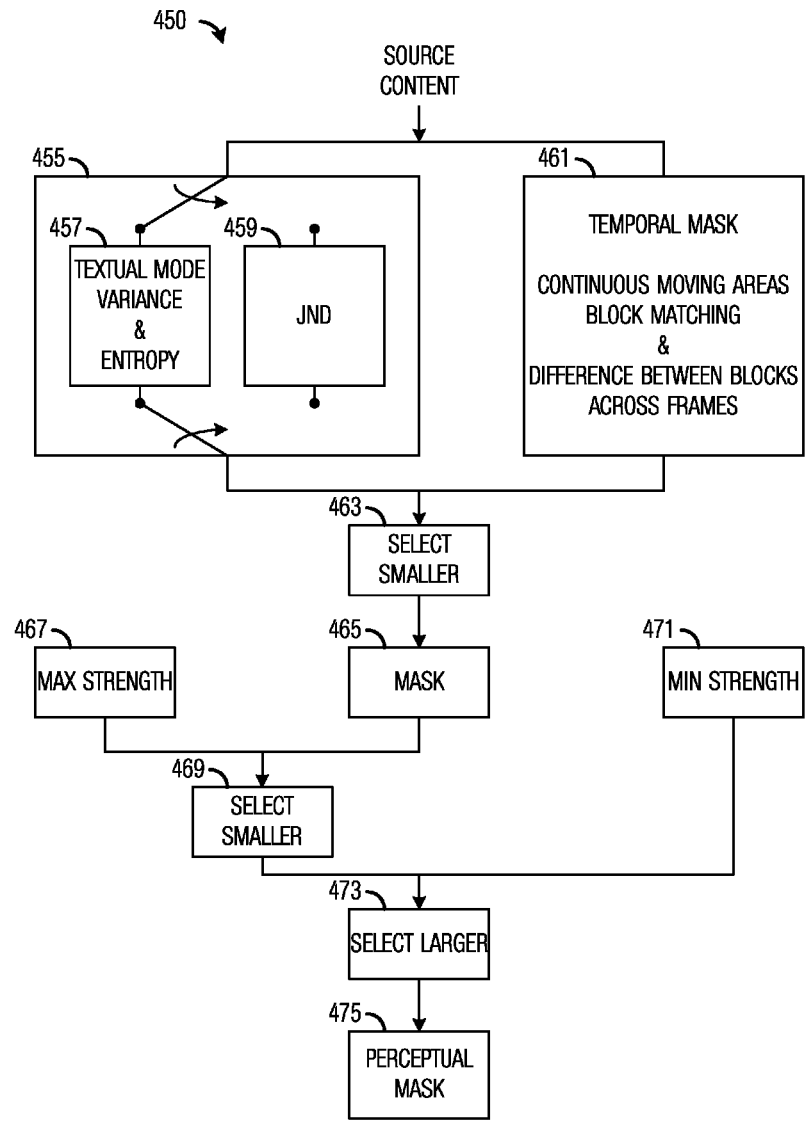
FIG. 4c shows a flow diagram of operations in generating a perceptual mask in accordance with exemplary embodiments of the present invention.

FIG. 4c illustrates a flow diagram of operations 450 in generating a perceptual mask. As discussed previously, generating a perceptual mask may make use of spatial domain information (block 455) and/or temporal domain information (block 461). Generating the perceptual mask using spatial domain information may make use of variance and/or entropy (block 457) or JND modeling (block 459), as previously described.

Generating the perceptual mask using temporal domain information may make use of block matching and differences between blocks. In accordance with one example embodiment, a smaller of the two values may be selected (block 463) and used to generate an embedding strength (block 465). The embedding strength may be compared with a maximum allowed embedding strength (block 467) and a smaller of the two is selected (block 469). Then, the selected embedding strength may then be compared with a minimum allowed embedding strength (block 471) and a larger of the two is selected (block 473). The selected embedding strength is then used to generate the perceptual mask (block 475).

Figure 5A:
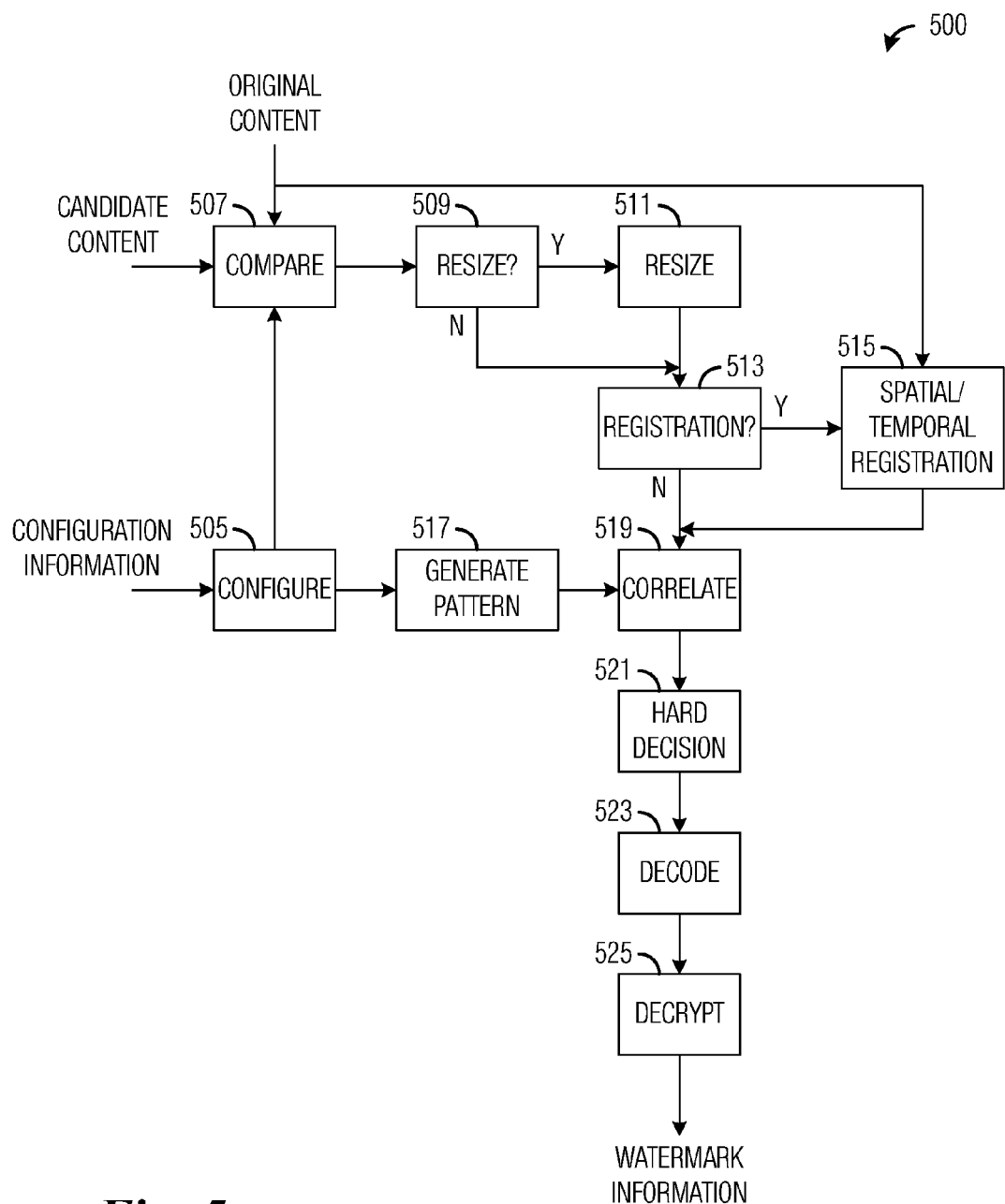
FIG. 5a illustrates an example diagram of a detecting system designed and configured in accordance with exemplary embodiments of the present invention.

FIG. 5a illustrates a detecting system 500. Detecting system 500 may be used to detect information embedded in media content and extract the information from the media content for track and trace purposes. According to an embodiment, the media content may contain information embedded using an embedding system, such as embedding system 400, discussed previously.

According to an embodiment, detecting system 500 may have three inputs: a candidate media content, which is the media content to be checked for embedded information; an original media content, which is media content corresponding to the candidate media content but without any information embedded; and configuration information, which is information related to the candidate media content and may include parameters of the candidate media content, keys used in encryption, sequence generation seeds, and so forth. As an example, if a type of the candidate media content and the original media content is a movie, then the configuration information may further include frame dimensions (width and height), frame rate, bit rate, and so on. Configuration unit 505 of detecting system 500 may verify the information in the configuration information for correctness, legitimacy, etc., and may save the configuration information for later use.

Detecting system 500 may compare physical properties of the candidate media content and the original media content (using a compare unit 507, for example) to ensure that the physical properties match. For example, if the type of the candidate media content and the original media content is a movie, then physical properties may include frame dimensions (e.g., width, height, diagonal length, etc.), frame rate, bit rate, and so on. Detecting system 500 may check to determine if the frame dimensions match using a resize check unit 509, wherein if the frame dimensions (or some other unit size or dimension, such as width, height, diagonal length, and so on) do not match, the frames of the candidate media content can be adjusted to match the frames of the original media content with resize unit 511, for instance. Resize unit 511 may use a bilinear interpolation/decimation technique to resize the frames of the candidate media content.

The candidate media content, if embedded with a watermark using an embedding system, such as embedding system 400, may have undergone geometric transformation(s), such as rotation(s), shifts and scaling operations, as well as other spatial or temporal geometric transforms. Detecting system 500 may be specially designed to be particularly sensitive to such geometric transforms, causing the detection of embedded information to completely fail when a complex transform is involved. Furthermore, an accidental attack from a third party may also impose geometric transforms upon the candidate media content in attempt to remove the embedded information. Common transforms of this kind may include affine transforms in the spatial domain, and frame adds/drops in the temporal domain.

In order to fully exploit sequence information of the original media content, it may be necessary to register the candidate media content to correspond to the original media content. As an example, if type of the candidate media content and the original media content is a movie, then a frame of the candidate media content may be registered to the original media content in both the spatial domain and the temporal domain. A registration check unit 513 may be used to determine if registration is needed and if registration is needed, a spatial/temporal registration unit 515 may be used to perform the registration.

Registration in the spatial domain may be based on a Kanade-Lucas-Thomasi (KLT) feature tracker algorithm. Since the most commonly seen geometric transforms imposed on the candidate media content are commonly rotations, shifts and/or scaling operations, or affine transforms, an affine model may be used in spatial domain registration, wherein an affine transform to a pixel in an image is expressible as $$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix}.$$

A principle of spatial domain registration is to find the six affine transform parameters (a through f) in the transform shown above to perform an inverse affine transform before detection of the embedded information is performed. In the case of video media content, the KLT feature tracker algorithm achieves this goal by finding corresponding feature points in a candidate frame and an original frame and provides the solution to the six affine transform parameters. The inverse affine transform may then be applied to the candidate frame in an implicit way. The candidate frame after application of the inverse affine transform may be referred to as a corrected frame $F^{(1)}$. For each pixel at location (x, y) of $F^{(1)}$, a pixel at location (x', y') of frame F' may be computed. Then, F'(x', y') as the pixel at location (x, y) in $F^{(1)}$ if x' and y' are integers; if x' and y' are non-integer, the pixel F'(x', y') may be obtained by interpolating a gray level of F' at (x', y').

However, due to the complexity of the transform and the imperfectness of the KLT feature tracker algorithm, the corrected frame $F^{(1)}$ after a one time inverse affine transformation is typically not a good estimation of the non-transformed watermarked frame. Therefore, it may be necessary to refine the estimation of $F^{(1)}$ by iteratively applying the KLT feature tracker algorithm. Specifically, the affine transform displacement may be expressed as $$\begin{pmatrix} \delta x \\ \delta y \end{pmatrix} = \begin{pmatrix} x' - x \\ y' - y \end{pmatrix} = \begin{pmatrix} a-1 & b \\ c & d-1 \end{pmatrix} \begin{pmatrix} x \\ y \end{pmatrix} + \begin{pmatrix} e \\ f \end{pmatrix}.$$

When an i-th iteration of the KLT feature tracker algorithm is applied to obtain $F^{(i)}$ and a corresponding affine parameter set u (which is a collection of affine transform parameters (a, b, c, d, e, and f) shown above), the displacement of each pixel may be computed. The iterative application of the KLT feature tracker algorithm may be repeated iteratively until $$\max_{(x,y) \in F} \{|\delta x|, |\delta y|\} < \varepsilon$$

is met. Typically, $\varepsilon$ is set to be about 0.5.

Registration in the temporal domain may involve the minimizing the mean-square error (MSE) between the candidate media content and the original media content to register the former to the latter. For video data, minimizing the MSE between a candidate frame and an original frame is used to perform temporal domain registration. In such instance, it may be necessary to assert a constraint that requires that no frames already displayed in the past may be captured in the future. More specifically, if there are two frames i and j in the candidate media content, where i<j, then when registering the candidate media content to the original media content, the registered frame numbers for frames i and j must satisfy $\alpha(i) \leq \alpha(j)$. For each frame in the candidate media content, the MSE for n=3 consecutive frames in the original media content is computed, with a first frame being the registered frame to a last registered frame in the candidate media content, and a current frame of the candidate media content being registered to a frame (out of the three frames in the original media content) with the minimal MSE.

Using the configuration information, detecting system 500 may regenerate the PN sequence used to generate the watermark embedded in the candidate media content with a generate pattern unit 517, for example. The PN sequence generated by generate pattern unit 517 may be identical to a PN sequence used in an embedder to spread the watermark prior to embedding into the media content. Generate pattern unit 517 may generate a PN sequence that is a frame-sized PN sequence derived from an m-sequence generator. According to an example embodiment, the PN sequence may be identical to the PN sequence used form the watermark that is embedded in the candidate media content.

For discussion purposes, suppose that the candidate frame has found a matching frame in the original media content, i.e., the original frame, to which it is registered. From the candidate frame and the original frame registered to the candidate frame, a normalized correlation coefficient may be computed with correlate unit 519, for example. The computation of the normalized correlation coefficient may make use of the PN sequence generated by generate pattern unit 517.

According to an example embodiment, a range of the normalized cross-correlation is between −1 and 1. The larger the absolute value of the normalized cross-correlation, the better chance the candidate frame contains the PN sequence, which is the watermark information embedded in the candidate. Each candidate frame corresponds to one coefficient value.

A hard decision unit 521 may be used to determine if a candidate frame contains the PN sequence. According to an example embodiment, a threshold in hard decision unit 521 may be set as 0, that is, if the normalized cross-correlation is larger than 0, it is decided that a bit "1" is embedded in the candidate frame, otherwise a bit "0" is embedded in the candidate frame. Hence, after a candidate frame is provided to hard decision unit 521, a binary sequence of the length of the candidate frame is obtained.

The binary sequence may be provided to a decode unit 523 that may perform error correction decoding on the binary sequence to produce a decoded binary sequence and a decrypt unit 525 that may decrypt the decoded binary sequence. According to an example embodiment, decrypt unit 525 may use a key identical to one used to encrypt the PN sequence or a key corresponding to a key used to encrypt the PN sequence. Output of decrypt unit 525 may be the information embedded into the original media content to produce the candidate media content. Additional processing may be performed on the output of decrypt unit 525 to verify if the output is indeed the same as the information embedded into the original media content. If the output is significantly different, e.g., greater than a threshold, then the media content may have been manipulated or somehow altered.

Figure 5B:
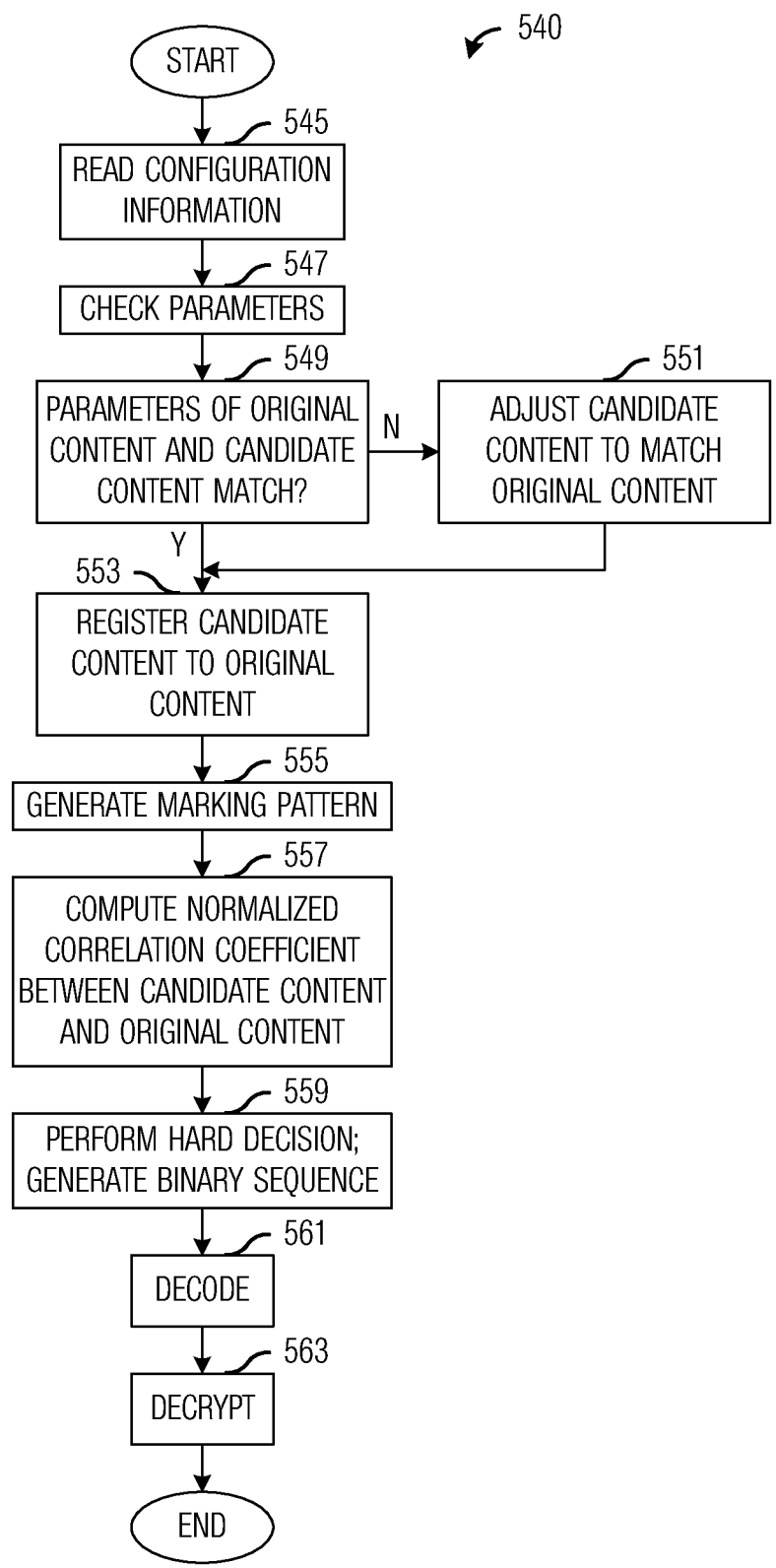
FIG. 5b shows a flow diagram of operations in detecting information in media content according to exemplary embodiments of the present invention.

In accordance with exemplary embodiments described herein, and the rules for flow diagrams previously described, FIG. 5b illustrates a flow diagram of operations 540 in detecting information in media content. Operations 540 may be indicative of operations occurring in a detecting system, such as detecting system 500, as the detecting system detects watermark information embedded in a candidate media content. Operations 540 may occur while the detecting system is in a normal operating mode.

Operations 540 may begin with the detecting system reading configuration information for the candidate media content (block 545). The detecting system may also verify correctness, legitimacy, and so on of the configuration information. The detecting system may further check parameters of the candidate media content and an original media content corresponding to the candidate media content (block 547). For example, the detecting system may check to see if the parameters are valid and that parameters of the candidate media content matches that of the original media content (block 549). If the parameters do not match, then the detecting system may adjust some of the parameters of the candidate media content to match those of the original media content (block 551). As an example, if the type of the candidate media content and the original media content is a movie, then physical properties may include frame dimensions (e.g., width, height, diagonal length, etc.), frame rate, bit rate, and so on. As mentioned before, if the frame dimensions do not match, then the detecting system may adjust or resize the frame dimensions of the candidate media content to match the frame dimensions of the original media content.

Alternatively, or in conjunction with the resizing adjustment, the detecting system may then register the candidate content in order to appropriately correspond to the original content (block 553). As discussed previously, registration may occur in the spatial domain, the temporal domain, or a combination thereof.

The detecting system may then generate a marking pattern that is embedded in the candidate media content (block 555). As an example, the detecting system may generate a PN sequence that was embedded into the original media content using an m-sequence generator. From the marking pattern, the testing system may compute normalized correlation coefficients between the candidate media content and the original media content (block 557).

A decision (e.g., a hard (yes or no) decision) may be used to determine the values of the information embedded in the candidate media content, thereby generating a binary sequence (block 559). Note that example embodiments consider using either a hard or soft (multi-valued) decision, although commonly a hard decision is used. The binary sequence may be decoded (block 561) and decrypted (block 563) to produce an estimate of the information embedded in the candidate media content. Further processing of the estimate of the information may be performed to determine if the information matches what was actually embedded into the original media content to determine if the candidate media content has been altered or otherwise manipulated; wherein after, operations 540 may terminate.

Figure 6:
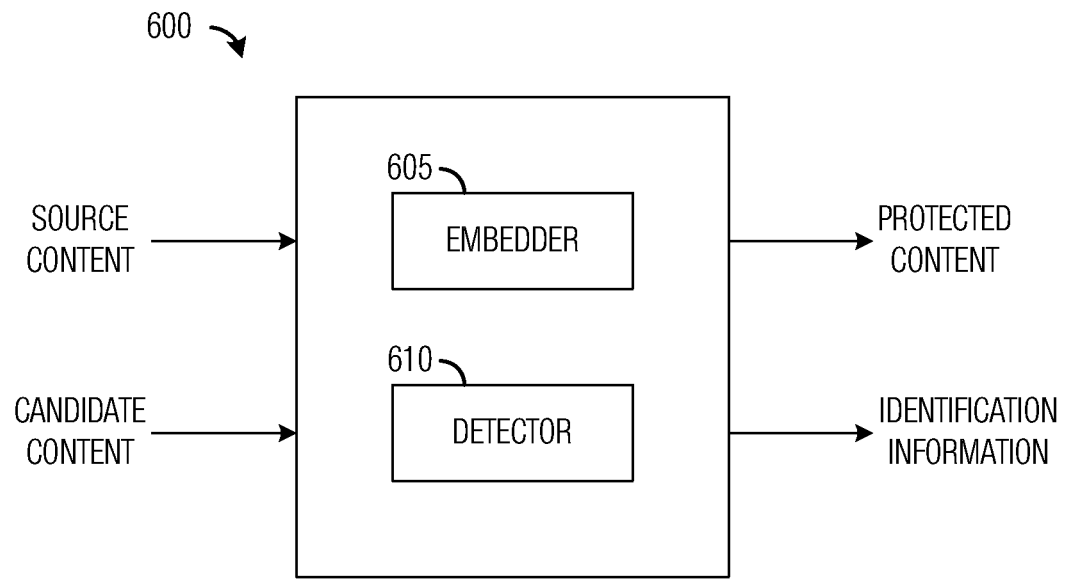
FIG. 6 illustrates an example diagram of a media content security system designed in accordance with exemplary embodiments of the present invention.

FIG. 6 illustrates a media content security system 600. Media content security system 600 may be used to protect media content from unauthorized distribution and may include an embedder 605 that may be used to embed information into media content. Media content security system 600 also includes a detector 610 that may be used to detect the presence of information embedded in media content and if there is information embedded in the media content, detector 610 may be able to extract the information from the media content. The information may be used to track and trace the distribution of the media content. According to an embodiment, embedder 605 may be an implementation of embedding system 400 and detector 610 may be an implementation of detecting system 500.

Figure 7:
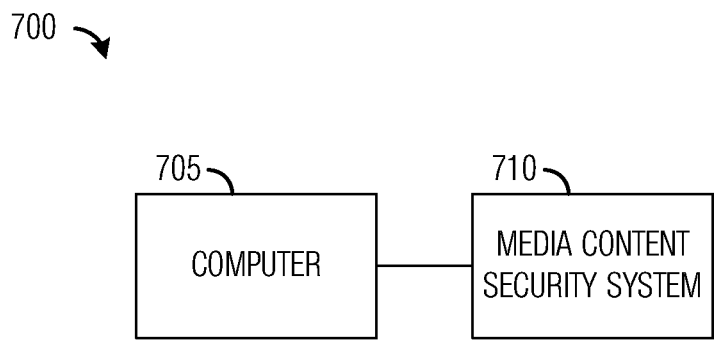
FIG. 7 illustrates an example diagram of a computing system designed and configured in accordance with exemplary embodiments of the present invention.

FIG. 7 illustrates a computing system 700. Computing system 700 includes a computer 705 and a media content security system 710. As described previously, media content security system 710 may be used to protect media content from unauthorized distribution and may include an embedder that may be used to embed information into media content. Media content security system 710 also includes a detector that may be used to detect the presence of information embedded in media content and if there is information embedded in the media content, detector may be able to extract the information from the media content. Computer 705 may serve as an interface to media content security system 710 allowing a user to interact with media content security system 710.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for distributing security media content, the method comprising:
    determining an embedding strength in accordance with media content, the determining comprising:
        computing a spatial mask;
        computing a temporal mask;
        selecting a smaller of the spatial mask or the temporal mask, thereby producing a selected mask;
        restricting the selected mask to reside within a range; and
        setting the restricted selected mask as the embedding strength;
    embedding a marking payload into the media content in accordance with the embedding strength, thereby producing embedded media content;
    applying a transform to the embedded media content, thereby producing secured media content; and
    distributing the secured media content.

2. The method of claim 1, wherein embedding the marking payload into the media content further comprises:
    generating the marking payload;
    encrypting the marking payload; and
    embedding the encrypted marking payload into the media content.

3. The method of claim 2, wherein embedding the marking payload into the media content further comprises encoding the encrypted marking payload.

4. The method of claim 3, wherein the encrypted marking payload is encoded with a convolutional code.

5. The method of claim 2, wherein the marking payload is further spread with a pseudo-random sequence generated by an m-sequence generator.

6. The method of claim 2, wherein encrypting the marking payload comprises encrypting the marking payload with an RSA algorithm, a Data Encryption Standard (DES) algorithm, Advance Encryption Standard (AES) algorithm, or a combination thereof.

7. The method of claim 1 wherein the range spans a minimum embedding strength to a maximum embedding strength.

8. The method of claim 1, wherein the media content comprises a sequence of video frames, and wherein embedding the marking payload into the media content comprises embedding the marking payload into each video frame in the sequence of video frames.

9. The method of claim 1, wherein applying the transform to the embedded media content comprises applying a geometric transform.

10. The method of claim 9, wherein the geometric transform comprises a shift operation, a resize operation, a rotation operation, a scaling operation, or a combination thereof.

11. A method for extracting information embedded in media content, the method comprising:
    registering a candidate media content to an original media content, including spatial domain registration using an iterative Kanade-Lucas-Thomasi feature tracker algorithm until a maximum value of a displacement is less than a threshold;
    correlating a marking pattern to the candidate media content, thereby producing a sequence of values;
    decrypting the sequence of values, thereby producing a decrypted sequence of values; and
    outputting the decrypted sequence of values as the information.

12. The method of claim 11, wherein registering the candidate media content to the original media content further comprises resizing the candidate media content in response to determining that a unit size of the candidate media content differs from a unit size of the original media content.

13. The method of claim 11, wherein registering the candidate media content to the original media content further comprises utilizing temporal domain registration.

14. The method of claim 13, wherein the iterative Kanade-Lucas-Thomasi feature tracker algorithm includes an affine transform displacement expressed as $$\begin{pmatrix} \delta x \\ \delta y \end{pmatrix} = \begin{pmatrix} x' - x \\ y' - y \end{pmatrix} = \begin{pmatrix} a-1 & b \\ c & d-1 \end{pmatrix} \begin{pmatrix} x \\ y \end{pmatrix} + \begin{pmatrix} e \\ f \end{pmatrix},$$

where x and y represent a pixel location, and a, b, c, d, e and f are affine transform parameters.

15. The method of claim 13, wherein temporal domain registration minimizes a mean-square-error between the candidate media content and the original media content.

16. The method of claim 11, further comprising decoding the sequence of values prior to decrypting the sequence of values.

17. The method of claim 11, further comprising generating the marking pattern from configuration information for the candidate media content.

18. The method of claim 11, wherein correlating the marking pattern to the candidate media content comprises:
    computing a plurality of normalized correlation coefficients between the candidate media content and the marking pattern; and
    making a decision for each normalized correlation coefficient in the plurality of normalized correlation coefficients.

19. The method of claim 18, wherein the decision is based on a hard decision.

20. A system comprising:
    an embedder configured to:
        receive media content,
        compute a spatial mask,
        compute a temporal mask,
        select a smaller of the spatial mask or the temporal mask, thereby producing a selected mask, restrict the selected mask to reside within a range, set the restricted selected mask as an embedding strength in accordance with the media content, embed information into the media content in accordance with the embedding strength to produce embedded media content, and transform the embedded media content to produce secured media content; and a detector configured to be coupled to a candidate media input and to a media content input, to match a candidate media content provided by the candidate media input to original media content provided by the media content input, to correlate a matching pattern to the candidate media content to produce a sequence of values, and to decrypt the sequence of values to produce information embedded in the candidate media content.

21. The system of claim 20, wherein the embedder is further configured to encode the information and to encrypt the information.

22. The system of claim 20, wherein the embedder is further configured to embed the information into the media content by generating a marking payload, encrypting the marking payload, and embedding the encrypted marking payload into the media content.

23. The system of claim 20, wherein the detector is configured to match the candidate media content to the original media content by resizing the candidate media content in response to determining that a unit size of the candidate media content differs from a unit size of the original media content, and registering the candidate media content to the original media content.

24. The system of claim 20, wherein the detector is configured to correlate the matching pattern to the candidate media content by computing a plurality of normalized correlation coefficients between the candidate media content and the matching pattern, and making a decision for each normalized correlation coefficient in the plurality of normalized correlation coefficients.

25. The system of claim 20, wherein the detector is further configured to decode the sequence of values.

26. The method of claim 14, wherein the iterative Kanade-Lucas-Thomasi feature tracker algorithm is repeated until $$\max_{(x,y)\in F} \{|\delta x|, |\delta y|\} < \varepsilon,$$

where F is a frame ands is the threshold.

27. The method of claim 26, wherein $\epsilon$ is set to about 0.5.

* * * * *